April 15, 1924.

J. F. SANDERS 1,490,714

AIR STOP FOR PEDAL SLOTS

Filed Aug. 21, 1923

Inventor
John F. Sanders
By
Attorney

Patented Apr. 15, 1924.

1,490,714

UNITED STATES PATENT OFFICE.

JOHN F. SANDERS, OF CAMERON, NORTH CAROLINA.

AIR STOP FOR PEDAL SLOTS.

Application filed August 21, 1923. Serial No. 658,555.

*To all whom it may concern:*

Be it known that I, JOHN F. SANDERS, of Cameron, in the county of Moore and State of North Carolina, a citizen of the United States, have invented certain new and useful Improvements in Air Stops for Pedal Slots, of which the following is a specification.

My present invention relates to air stops for Ford pedal slots, and particularly to a device of this character intended and adapted to close the slots in which the control pedals work and thus guard against ingress of air at these points.

An object of this invention is to provide a stop structure which is entirely flexible and yielding, thus offering no interference or resistance to full operation and manipulation of the control pedals, and which is of such construction that it entirely closes the openings through the slots when the pedals are in normal operating position.

A further object resides in so constructing the stop that this stop is held in operative position by the pressure of the air coming from the cooling fan, and by air resistance and pressure when the machine is in motion.

Another object lies in providing an air stop of the character described which is of simple and inexpensive construction, and which can be readily fitted and mounted for use by use by the individual operator of the machine, without the use of special tools and without requiring the services of a skilled mechanic.

With these and other objects in view, which will be apparent to those skilled in the art, my invention includes certain novel features of construction and combination of parts which will now be set forth:

Figure 1:
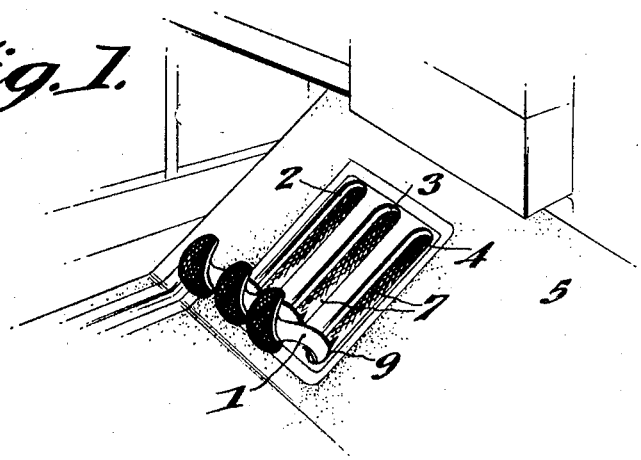
Figure 1 is a view in perspective showing a fragmentary portion of the footboard and control parts of a Ford automobile, with my improved air stop fitted in place.
Figure 2:
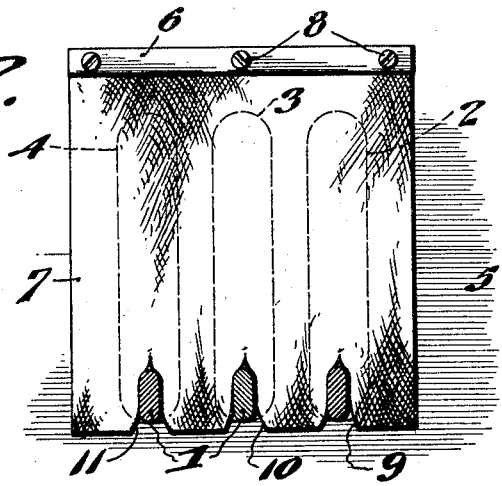
Fig. 2 is a bottom plan view of the floor boards showing my air stop structure in place.

As shown in Fig. 1, the parts of the Ford automobile are not to be changed or altered in any way whatsoever; and, the movement of the pedal stems 1, of the clutch, reverse, and brake pedals in the slots 2, 3 and 4 of the footboard 5, will not in any way be interfered with by my improved stop structure. Any desired type of floor mat can be used upon the floor boards, and this can be cut out or shaped to give full clearance around the various pedal slots without thought of reducing the clearance of the pedal stem 1 to a minimum as is now customary.

My improved air top structure consists essentially of a retaining strip 6 and a stop strip 7, which is of oil cloth or other fabric material, of rubber, leather or in fact any suitable flexible sheet material. The retaining band 6 is made of a length to extend on each side beyond the clutch and brake pedal slots 2 and 4, when this retaining band is fitted transversely on the under side of the upper floor board inwardly of the several slots, and screws or other suitable fastenings 8 are provided for securement of this retaining band.

The strip or sheet of material 7 is preferably crimped within or otherwise secured in conjunction with the retaining band 6, and is provided with substantially V-shaped notches 9, 10 and 11, at its opposite edge to be substantially in line with the slots 2, 3 and 4 and to receive the stems 1, of the several control pedals. This flexible strip 7 is made of sufficient width to extend laterally beyond the side slots 2 and 4 for perhaps one and one-half inches, although a greater or lesser extension may be found desirable.

Figure 3:
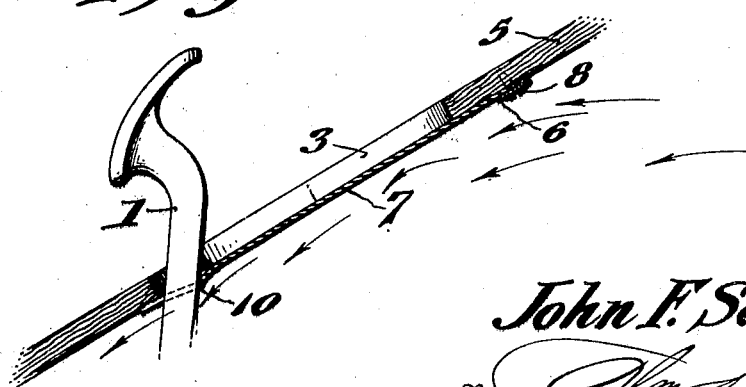
Fig. 3 is a sectional view through one of the pedal slots to better show the fitting of my air stop.

In the use of my improved air stop, the retaining band 6 is secured on the lower side of the upper inclined floor board in advance of the pedal slots, and with the notches 9, 10 and 11 of the free edge of strip 7 disposed to give slight clearance at the rear ends of the several slots. In the normal operation of the machine, the several control pedals will be at or substantially adjacent the rear ends of the slots 2, 3 and 4, and the flexible sheet or strip 7 will be held against the under side of the inclined floor boards by the pressure of air from the fan or by the pressure of the atmospheric air due to the forward motion of the machine, and notched portions of this sheet or strip will be firmly pressed around the stems 1 of the several control pedals to exclude air around the pedal stems, the force of the air adjacent the slots being substantially as indicated by the arrows in Fig. 3. With the parts fitted and mounted in the manner set forth, the flexible sheet or strip 7 may fall away from the floor boards when the machine is stopped or when it is being propelled in the reverse, but while the engine is operating and while the machine is traveling forward the air pressure will cause the sheet or strip to be forced upwardly to lie flat against the under side of the floor boards and to complete the cover the slots 2, 3 and 4 the V-shaped notch being held in a snug fit around the pedal stems 1.

From the foregoing, it will be seen that I have provided an air stop for Ford pedal slots which is of very simple and inexpensive construction, and which is very effective and efficient in use, and while I have herein shown and described only certain specific embodiments and have mentioned the use of only certain pieces of material, it will be appreciated that changes and variations can be resorted to without departing from the spirit and scope of my invention.

I claim:

1. An air stop for Ford pedal slots, comprising a strip of flexible material secured at one edge of the under side of the inclined floor boards of the automobile in advance of the pedal slots and having its opposite edge provided with notches in line with the pedal slots.

2. An air stop for Ford pedal slots, comprising a retaining strip to be secured transversely on the under side of the floor boards in advance of the pedal slots, and a sheet of flexible material secured at one edge of said retaining band to have its body portion held against the lower side of the floor boards over said slots by air pressure.

3. An air stop for Ford pedal slots, comprising a retaining strip to be secured transversely on the under side of the floor boards in advance of the pedal slots, and a sheet of flexible material secured at one edge of said retaining band to have its body portion held against the lower side of the floor boards over said slots by air pressure, said flexible sheet having notches in the edge opposite the secured edge to provide for the pedal stems when in a normal operating position.

In testimony whereof I hereunto affix my signature.

JOHN F. SANDERS.